No. 663,635. Patented Dec. 11, 1900.
J. B. MURRAY.
FRUIT OR VEGETABLE SLICING MACHINE.
(Application filed Jan. 23, 1899.)
(No Model.)
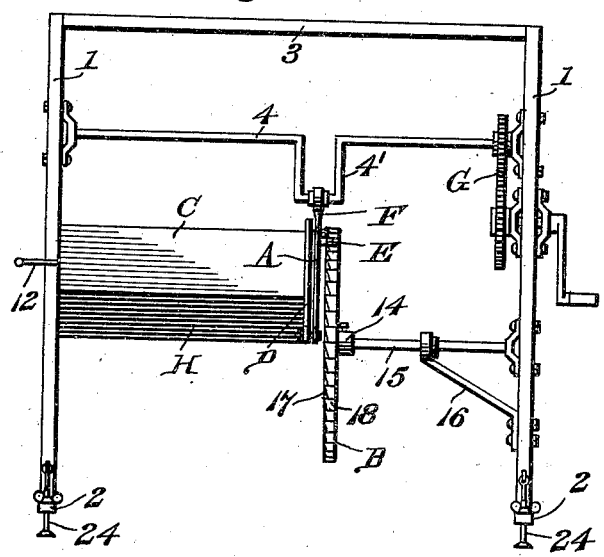
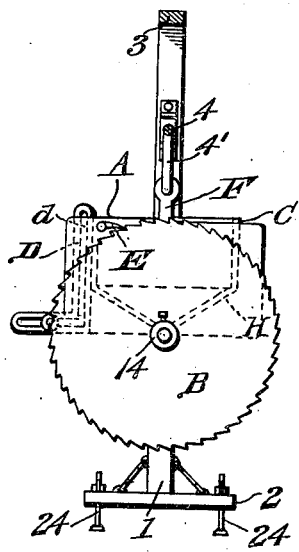
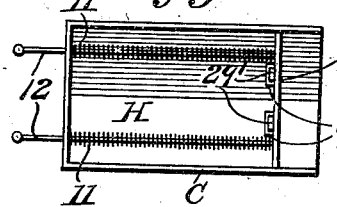
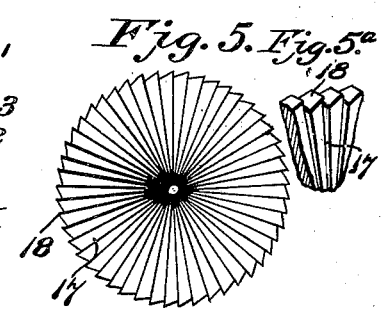
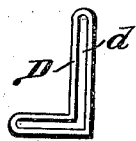
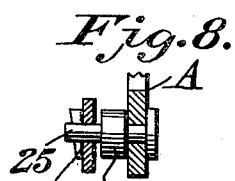
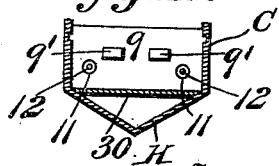
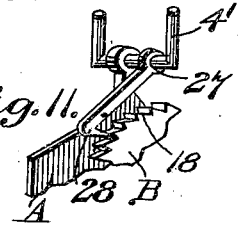
Witnesses
Edwin G. McKee
E. M. Young
Inventor
J. Barrett Murray
By William L. Ford
Attorney
THE NORRIS PETERS CO., PHOTO-LITHO., WASHINGTON, D. C.

UNITED STATES PATENT OFFICE.

JOSEPH BARRETT MURRAY, OF DU QUOIN, ILLINOIS.

FRUIT OR VEGETABLE SLICING MACHINE.

SPECIFICATION forming part of Letters Patent No. 663,635, dated December 11, 1900.

Application filed January 23, 1899. Serial No. 703,206. (No model.)

*To all whom it may concern:*

Be it known that I, JOSEPH BARRETT MURRAY, a citizen of the United States, residing at Du Quoin, in the county of Perry and State of Illinois, have invented a new and useful Fruit or Vegetable Slicing Machine, of which the following is a specification.

This invention relates to fruit, vegetable, and meat slicing machines, and has for its object the provision of a device of this class which will be simple in construction and easy of operation and adapted to perform its offices in a highly-satisfactory manner.

One of the principal objects of the invention is the provision of improved means for feeding the material to the cutting or slicing mechanism and gaging the thickness of the slices.

Another object is to provide improved means for removing the slice in order to allow a regular and steady feed of the material being cut and prevent clogging.

A further object is to provide a novel form of feed-box which will be adapted for the proper accommodation of different kinds of material to be cut.

Having the foregoing and other objects in view, the invention consists of certain improved features and novel combinations of parts appearing more in detail hereinafter and particularly recited in the appended claims.

In the accompanying drawings, Figure 1 is a side elevation; Fig. 2, an end view looking toward the gage-disk; Fig. 3, a detail plan view of the feed-box; Fig. 4, a cross-section thereof, taken in front of the feeder; Fig. 5, a face view of the gage and delivery-disk; Fig. 5ª, a detail perspective view of a portion of the disk. Fig. 6 is a view of the knife-guide; Fig. 7, a view of the knife; Fig. 8, a detail of the guide end of the knife; Fig. 9, a detail of the ratchet; Fig. 10, a view illustrating the use of a false bottom in the feed-box; Fig. 11, a detail of a modified form of ratchet.

The frame of the machine consists of uprights 1, having feet 2, connected by a cross-bar 3.

C is a feed-box secured to one of the uprights 1 for holding the fruit, vegetables, meat, or other material to be sliced, which is open at the top and the end adjacent the slicing mechanism and has a V-shaped bottom H to facilitate the guiding and proper retention of the material when being sliced. In the box and extending thereacross is a feeder 9, which has pins 13', adapted to travel in slots 13 in the sides of the box, thus guiding the feeder in its movement and preventing it from rising in the box. The feeder has a supplemental piece 29, of V shape, fitting the bottom of the feed-box, and this piece can be secured to the main portion 9 of the feeder in any preferred manner permitting detachment. In the present instance I provide braces 29', secured to the piece 29 and fitting in loops 9' on the feeder 9. The piece 29 is made detachable in order that it can be removed and a false bottom 30 fitted in the feed-box when certain kinds of vegetables, fruit, and bread are to be sliced which can be cut to better advantage on a flat bottom.

The automatic steady feed of the feeder is accomplished by rods 12, secured thereto, which pass loosely through the closed end of the box, and coil-springs 11, surrounding the rods and interposed between the feeder and the said closed end.

Journaled in suitable bearings on the uprights 1 above the feed-box is a power-shaft 4, having a crank 4' and operated by suitable multiplying-gearing G.

A represents the knife or cutter for taking off the slice, the same being provided with a pitman F, which is connected to the crank 4'. This knife is positioned to play across the open end of the feed-box in close proximity thereto and carries a stub-shaft 25 at its free end, on which a roller 10 is held by a washer and cotter 26.

A guide D, having a right-angular slot *d* therein, is secured to the feed-box, and the roller 10 travels in said slot.

The knife carries ratchet mechanism E, (shown in detail in Fig. 9,) comprising a stub-shaft 19, secured to the face of the knife, a collar 20 having a hub 23 and secured to the shaft by a set-screw 20'', and a stop-collar 20' having a semicircular recess 21 in its face and secured to the shaft by a set-screw 21', and a spring 22, which has one end secured to collar 20 at 22', is then coiled around hub 23 and finally passed around the ratchet E. The ratchet E is loosely mounted on the shaft 19 and located between the two collars, and it has a lug $e$, which is positioned to move in the recess 21 and abut the shoulders at the ends of said recess, which limit the play of the ratchet.

I sometimes prefer to employ the ratchet shown in Fig. 11, where the ratchet is hung from the pitman 4' at 27 and is provided with a hooked or bent end 28.

The numeral 15 designates a rotatable stub-shaft projecting from the standard 1 toward the delivery end of the feed-box and supported by a bracket 16.

B is a combined gage and delivery-disk having a serrated or ribbed face 17 and teeth 18 on its edge, said disk being secured on shaft 15 by a set-screw passing through its hub 14. The serrated face of the disk is located adjacent the knife A, and the ratchet E is pressed against the teeth 18 on the disk by the spring 22. The set-screw on the disk constitutes a means for adjusting the disk on the shaft toward and away from the knife, thereby making provision for cutting the material being sliced into slices of any thickness, as the springs 11 will always hold the material pressed against the serrated face of the disk. Clamping-bolts 24 are provided on the feet 2 for holding the device on any fixed object.

The operation is as follows: The meat, bread, vegetables, or other material having been placed in the feed-box is pushed forward and against the face of the disk by the feeder, and when the gearing G is operated the knife takes off a slice from the end of the material, being guided in its movement by the slot. When the knife is drawn back by the rotation of its shaft, the ratchet engages the teeth on the disk and rotates it, whereupon the disk removes the slice already cut, and the material remaining in the feed-box is then fed forward ready for a new cut.

It is obvious that this invention could be varied in many particulars without impairing its efficiency or changing its operation, and I do not therefore limit myself to the precise constructions herein shown and described, but consider that I am entitled to all changes coming within the spirit and scope of the invention.

Having thus described my invention, what I claim as new, and desire to secure by Letters Patent, is—

1. In a device of the class described, the combination with a feed-box having a depending trough-like bottom, and a false bottom above said depending bottom, of a feeder movable in said box composed of a main member fitting the upper part of the box, and a supplemental member, detachably connected to the main member and adapted to fit the depending portion of the box when the false bottom is removed.

2. In a device of the class described, the combination with a feed-box, of a movable abutment for the end of the material from which the slice is to be taken, which remains stationary while the slice is being cut, and a cutter-knife and means for operating the abutment when the slice has been cut.

3. In a device of the class described, the combination with a feed-box, of a rotatable disk located adjacent the delivery end of the box and constituting an abutment for the material being cut, and which remains stationary while the slice is being cut, means for rotating said disk on completion of the cut, and a knife or cutter.

4. In a device of the class described, the combination with a feed-box, of a rotatable abutment-disk located adjacent the delivery end of the box and adjustable toward and away from said end, whereby the thickness of the slice can be regulated, and a knife or cutter which is movable independently of the disk.

5. In a device of the class described, the combination with a feed-box, of a knife or cutter operating across said box, a rotatable abutment-disk located adjacent the end of the box adapted to remove the slice after it has been cut, and a ratchet on the knife adapted to engage the disk to rotate it.

6. In a device of the class described, the combination with a feed-box, of a knife or cutter operating across the box, a rotatable abutment-disk located adjacent the end of the box adapted to remove the slice after it has been cut, said disk having ratchet-teeth, a stub-shaft on the knife, two separated collars secured to the shaft, one of which has a recess provided with two shoulders, a ratchet loose on the shaft and located between the collars, said ratchet having a lug adapted to play in the recess and engage the shoulders, and a spring connected to one collar and holding the ratchet in engagement with the teeth on the disk.

7. In a device of the class described, the combination with a feed-box, of a rotatable abutment-disk for the material and a cutter or knife which is independently movable.

J. BARRETT MURRAY.

Witnesses:
DECATUR A. SMITH,
JAMES A. DUNN.